(12) United States Patent
Shimoda et al.

(10) Patent No.: US 6,349,552 B2
(45) Date of Patent: Feb. 26, 2002

(54) TEMPERATURE CONTROL DEVICE FOR THERMAL MEDIUM FLUID

(75) Inventors: Kazuyoshi Shimoda, Tokyo; Yasushi Sakamoto; Hideo Ryu, both of Shizuoka; Motoharu Sugiyama, Numazu; Ikuo Watanabe, Susono; Kazunori Takikawa, Numazu, all of (JP)

(73) Assignee: Usui Kokusai Sangyo Kaisha Ltd., Shizuoka (JP)

( * ) Notice: Subject to any disclaimer, the term of this patent is extended or adjusted under 35 U.S.C. 154(b) by 0 days.

(21) Appl. No.: 09/730,766

(22) Filed: Dec. 7, 2000

(30) Foreign Application Priority Data

Dec. 8, 1999 (JP) .............................. 11-348595
Aug. 17, 2000 (JP) ....................... 2000-247385

(51) Int. Cl.[7] ................................................ F25B 39/04
(52) U.S. Cl. .......................................... 62/183; 62/435
(58) Field of Search ........................ 62/783, 434, 435, 62/506, 430

(56) References Cited

U.S. PATENT DOCUMENTS

| | | | | |
|---|---|---|---|---|
| 4,135,571 A | * | 1/1979 | Tamblyn et al. | 62/434 |
| 4,492,092 A | * | 1/1985 | Smorol et al. | 62/183 |
| 5,323,618 A | * | 6/1994 | Yoshida et al. | 62/430 |
| 5,372,011 A | * | 12/1994 | O'Neal | 62/434 |
| 5,598,716 A | * | 2/1997 | Tanaka et al. | 62/434 |
| 5,970,729 A | * | 10/1999 | Yamamoto et al. | 62/178 |
| 6,059,016 A | * | 5/2000 | Rafalovich et al. | 62/434 |

FOREIGN PATENT DOCUMENTS

| JP | 9-72644 | 3/1997 |
|---|---|---|
| JP | 9-196512 | 7/1997 |

* cited by examiner

Primary Examiner—William E. Tapolcai
Assistant Examiner—Mohammad M. Ali
(74) Attorney, Agent, or Firm—Wenderoth, Lind & Ponack, L.L.P.

(57) ABSTRACT

A temperature control device for a constant temperature chiller unit or a vending machine is provided. Thermal medium fluid such as water in the chiller unit is accurately controlled under starting mode, heating mode and cooling mode. Thermal medium fluid such as air in the vending machine is conveniently controlled in winter mode and summer mode. In the device, a heat exchanger is interposed within a compression circuit, and a bypass circuit is disposed at the downstream side of a pump so that through the bypass circuit thermal medium fluid receives heat from the heat exchanger. Thus, the temperature of thermal medium fluid supplied to an external secondary heat load is controlled.

6 Claims, 7 Drawing Sheets

TEMPERATURE CONTROL DEVICE FOR THERMAL MEDIUM FLUID

BACKGROUND OF THE INVENTION

This invention relates to a temperature control device for a constant temperature chiller unit which provides thermal medium fluid such as cold water of constant temperature toward a semiconductor manufacturing device, a laser machine, or miscellaneous scientific or chemical instruments in a fluid circulating mode, and to a temperature control device for an automatic vending machine which stores articles therein and can change itself into a cooling mode and heating mode in relation to the season or other conditions.

In the prior constant temperature chiller unit, thermal medium fluid such as pure water or "fluorinert" (supplied by 3M corporation) is supplied through a refrigerating system comprised of a compressor, a condenser and an evaporator for fron gas (Freon gas). In this process, high temperature fron gas compressed by a compressor is liquidized by a condenser into liquid fron, and the liquid fron absorbs heat from the surroundings when it is evaporated by an evaporator, whereby produced is a temperature medium fluid such as low temperature pure water or "fluorinert".

When the range of the allowable temperature is limited in a small range, such as in a semiconductor manufacturing device which requires an accurate setting of plus and minus 1 degree C., if the refrigerator (evaporator) is operated at a maximum power for cooling, the temperature of the thermal medium fluid goes down too low, thereby being overcooled. For compensating this problem, a constant temperature tank having a buffer capacity of three to five times of cold water flow per minute is disposed, and the tank is provided with an electrical heater for controlling the temperature. Then, extra electrical power is necessary, whereby the overall size of the apparatus becomes large and additional cost for setting and operation becomes necessary.

Referring to FIG. 8, there is shown a constant temperature tank with a heater of prior art. The constant temperature tank 16 produces cold water by a refrigerating circuit 1 comprised of a compressor 12, a condenser 14 and an evaporator 20. The produced cold water is supplied to the external secondary heat load 24 such as a semiconductor manufacturing device by the pump 22, and is circulated within the cold water circulating circuit 3. In the refrigerating circuit 1, there is provided a dryer 15, and in the cold water circulating circuit 3, there are provided a pressure controller 17, a relief valve 19 and pressure gauge G. Within the constant temperature tank 16, there are provided a sensor for detecting overheating and freezing, and a sensor for detecting water level of the tank. Each sensor is connected to an overheat and freezing monitor (arrow A) and to a water level monitor (arrow B), respectively. To the bottom of the tank 16, a drain circuit 28 is connected and a drain valve 29 is disposed for controlling the drain port (arrow C).

Thus, high temperature fron gas (refrigerant) compressed by a compressor 12 in the refrigerating system is liquidized by a condenser 14 into liquid fron, and the liquid fron absorbs heat from the surroundings when it is evaporated by the evaporator 20, whereby cold water is produced. On the other hand, the condenser 14 is exposed to high temperature. For cooling the condenser 14, a cooling circuit 2 comprised of a water cooling type cooler 26 is provided. The cooler 26 is cooled by any of cooling tower water, factory circulating water or underground water. In this circuit 2, cooling water is circulated by operating a flow switch 25 and a control valve 27, so that the condenser 14 is cooled.

However, when the range of the allowable temperature is limited in a small range, such as in a semiconductor manufacturing device, if the evaporator 20 (refrigerator) is operated at a maximum power for cooling, the temperature of the thermal medium fluid goes down too low, thereby being overcooled. For compensating this problem, an electrical heater 50 is attached to the constant temperature tank 16 for controlling its temperature. The heater 50 is also used for raising the temperature of thermal medium fluid during its starting mode. As a result, extra electrical power is required, whereby an additional cost is required.

In other methods for controlling the temperature, a hot gas bypass method and a refrigerator ON and OFF method are known. However, in the former method, cooling and heating should be alternately exchanged, whereby the response of temperature control is poor and the bypass valve is not reliable so that it often fails. In the latter method, a large capacity buffer tank should be disposed, so that the overall size becomes larger and the accuracy of the temperature control becomes poor.

In an automatic vending machine which can change itself into a cooling mode and heating mode in relation to the season, a powerful heater is inevitable. Accordingly, extra electrical power is required and thus an additional cost is required.

Japanese unexamined patent publication No. Hei 9-72644 entitled "Cold water circulation supply machine for scientific and chemical machines" and Japanese unexamined patent publication No. Hei 9-196512 entitled "Cooling liquid supply device" relate to a constant temperature chiller unit as a cold water supply device.

SUMMARY OF THE INVENTION

It is a first object of the present invention to provide a temperature control device for thermal medium fluid in which an electrical heater is eliminated from the constant temperature tank thereby reducing the electrical power so that it can improve the accuracy and response of the device.

It is a second object of the present invention to provide a temperature control device for thermal medium fluid in which the constant temperature tank is eliminated thereby reducing the overall size of the device.

It is a third object of the present invention to provide a temperature control device for thermal medium fluid in which the working range is extended from −40 degree C. to 60 degree C. relative to the prior art.

It is a fourth object of the present invention to provide a temperature control device for thermal medium fluid in which the electrical power in a starting mode is considerably reduced.

It is a fifth object of the present invention to provide a power saving type temperature control device for an automatic vending machine which stores articles therein and can change itself into a cooling mode and heating mode in relation to the season or other conditions.

A first object of the present invention is achieved by the device in which a heat exchanger is interposed within a compression circuit between a compressor and a condenser so that the compression circuit becomes a primary circuit of the heat exchanger, and a bypass circuit is disposed at the downstream side of a pump. Through the bypass circuit, thermal medium fluid passes through a secondary circuit of the heat exchanger toward a circulation circuit, and fluid flow in the bypass circuit is controlled by a flow control valve. Heated thermal medium fluid by the heat exchanger is introduced into the circulation circuit. Thus, the temperature of thermal medium fluid supplied to an external secondary heat load is controlled.

Based upon above characteristics of the first embodiment of the invention, a part of the heat of the high temperature fron gas compressed by the compressor is given to the thermal medium fluid (water) which is supplied to the external secondary heat load so that the temperature of the overcooled thermal medium fluid (cold water) cooled by the regrigerating circuit is raised and controlled within a predetermined temperature range. Thus, the accuracy and response of the device are improved. Since the electrical heater in the prior art is eliminated, the electrical power and cost are reduced.

The second object of the present invention is achieved by the device in which the evaporator is comprised of multitube type cylindrical evaporator and this cylindrical evaporator works as the constant temperature tank. The capacity of the cylindrical evaporator is preferably 0.1 to 2.0 times of cold water flow per minute, more preferably 0.25 to 1.5, further preferably 0.5 to 1.0. Thus, according to the invention, it becomes possible to eliminate the constant temperature tank so that the overall size of the device is reduced.

The third object of the present invention is achieved by a similar device as the first aspect of the invention. In addition to the first aspect, a cooling circuit of the condenser is disposed. Further, a second bypass circuit is interposed between the downstream side of the condenser and the downstream side of the evaporator, and a capillary tube and an electromagnetic valve are disposed within the second bypass circuit. Fluid flow in the second bypass circuit is controlled by the electromagnetic valve, whereby the cooling temperature cooled by the evaporator is controlled and overheating of the compressor is prevented. In this aspect, since the cooling temperature of the evaporator can be controlled by the second bypass, the working temperature range is considerably extended relative to the prior art.

The fourth object of the present invention is achieved by a modification of the above aspect. In the modification, an electromagnetic valve with a throttle valve is disposed within the cooling circuit for the condenser, whereby the temperature of the condenser is controlled. Thus, the controllable temperature range of the device is extended. Especially, at the starting mode, by stopping the cooling of the condenser, it becomes possible to rapidly raise the temperature of the device toward a predetermined value.

The fifth object of the present invention is achieved by a temperature control device for an automatic vending machine which stores articles therein and can change itself into a cooling mode and heating mode in relation to the season or other conditions. According to the characteristics of the device, it comprises at least one article storing compartment, and a refrigerating circuit having a compressor, condenser and an evaporator. A first electromagnetic valve is disposed at the inlet side of the evaporator, and a second electromagnetic valve is disposed at an intermediate point between the outlet side of the compressor and the inlet side of the condenser. A bypass circuit with a third electromagnetic valve is interposed between the outlet side of the compressor and the inlet side of the condenser so that this bypass circuit can bypass the second electromagnetic valve. A heat exchanger is disposed within the bypass circuit, and the evaporator and the heat exchanger are disposed within the article storing compartment. Thus, it is possible to select itself a heat absorbing mode by the evaporator or heat emitting mode by the heat exchanger through the exchange operation of the first, second and third electromagnetic valves.

Based upon the above characerics, according to the automatic vending machine of the invention, a conventional powerful electric heater for heating the articles is saved and a small heater may be substituted for the powerful heater. Thus, electric power and cost are considerably saved.

As a preferable modification of the above characteristics, a second bypass circuit is interposed between the downstream side of the condenser and the downstream side of the evaporator, and a capillary tube and a fourth electromagnetic valve are disposed within the second bypass circuit. Fluid flow in the second bypass circuit is controlled by the fourth electromagnetic valve so that the cooling temperature cooled by the evaporator is controlled. Thus the temperature control range is considerably extended.

Other characteristics and advantages of the present invention will be apparent from a reading of the following specification referring to the attached drawings.

DESCRIPTION OF THE PREFERRED EMBODIMENT

Figure 1:
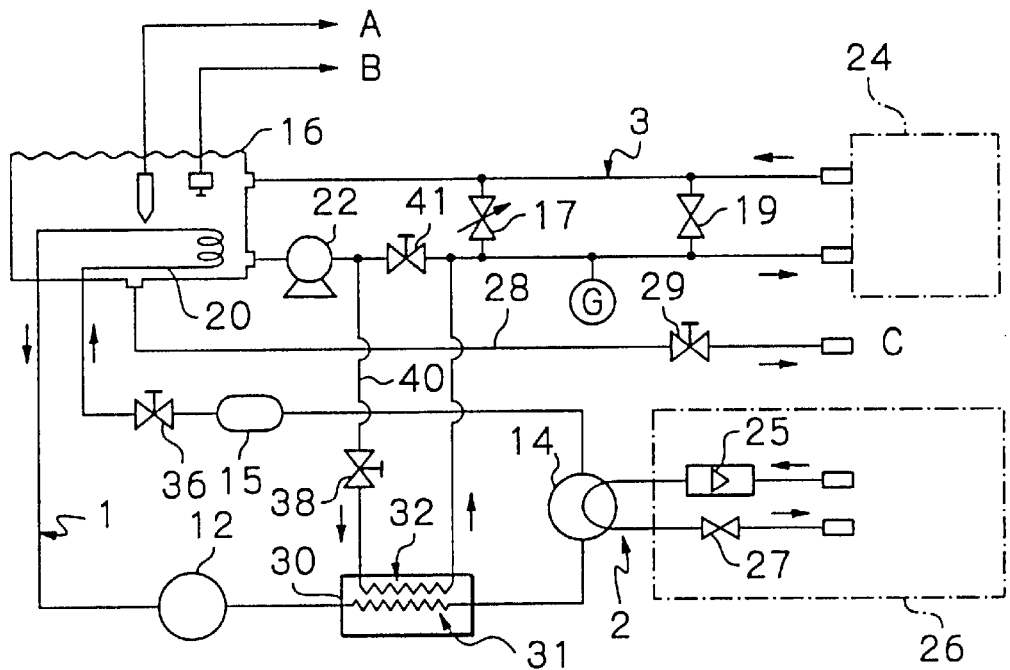
FIG. 1 is a schematic diagram of the temperature control device according to the first embodiment of the invention.

Referring to FIG. 1, there is shown a temperature control device for thermal medium fluid of a first embodiment of the present invention. This device comprises a refrigerating circuit 1, a cooling circuit 2 for a condenser 14, and a thermal medium fluid circulation circuit 3 for circulating thermal medium fluid toward an external secondary heat load 24 by a pump 22. The circuit 1 includes a compressor 12, a condenser 14, a PI (proportional integral) control expansion valve 36, and an evaporator 20. A constant temperature tank 16 produces cold water (thermal medium fluid) by the refrigerating circuit 1, and the produced cold water is supplied to the external secondary heat load 24 such as a semiconductor manufacturing device by the cold water supply pump 22. The condenser 14 is provided with a water cooling type cooler 26 which can be cooled by cooling tower water, factory circulation water or underground water, so that the condenser 14 is cooled by a cold water circulation operated by a flow switch 25 and a water flow control valve 27.

Based upon the charasterics of the invention, a heat exchanger 30, preferably made by a multi-tube type having a property of small flow resistance, is interposed within a compression circuit between the compressor 12 and the condenser 14 so that the compression circuit 31 becomes a primary circuit of the heat exchanger 30. The PI control type expansion valve 36 and a dryer 15 are disposed within a condensed circuit from the condenser 14 to the evaporator 20. At the downstream side of the cold water supply pump 22, a bypass circuit 40 is disposed so that through the bypass circuit thermal medium fluid passes through the secondary circuit 32 of the heat exchanger 30 toward the circulation circuit 3.

Thus, a part of the cold water supplied from the cold water supply pump 22 to the secondary heat load 24 is delivered to the bypass 40 by an operation of an electrically driven flow control valve 38, whereby cold water heated by the heat exchanger 30 is returned to the cold water circulation circuit 3 toward the downstream side of the cold water supply pump 22. By electrically controlling the fluid flow passing through the flow control valve 38, the quantity of heated water mixed with the cold water supplied to the external secondary heat load 24 can be controlled. Thus, temperature control of the cold water is effected.

In addition, a cut off valve 41 is disposed within the circulation circuit 3, so that together with the operation of the flow control valve 38 all of the cold water flow directed toward the external secondary heat load 24 can be introduced into the bypass 30.

As a result of an experiment using this temperature control device, an electrical power consumption is reduced to fifty percent relative to the prior chiller unit, so that the temperature control performance is greatly improved. Further, since the electrical heater is eliminated, the size of the chiller unit is reduced and quantity of circulation water is relatively saved.

Figure 2:
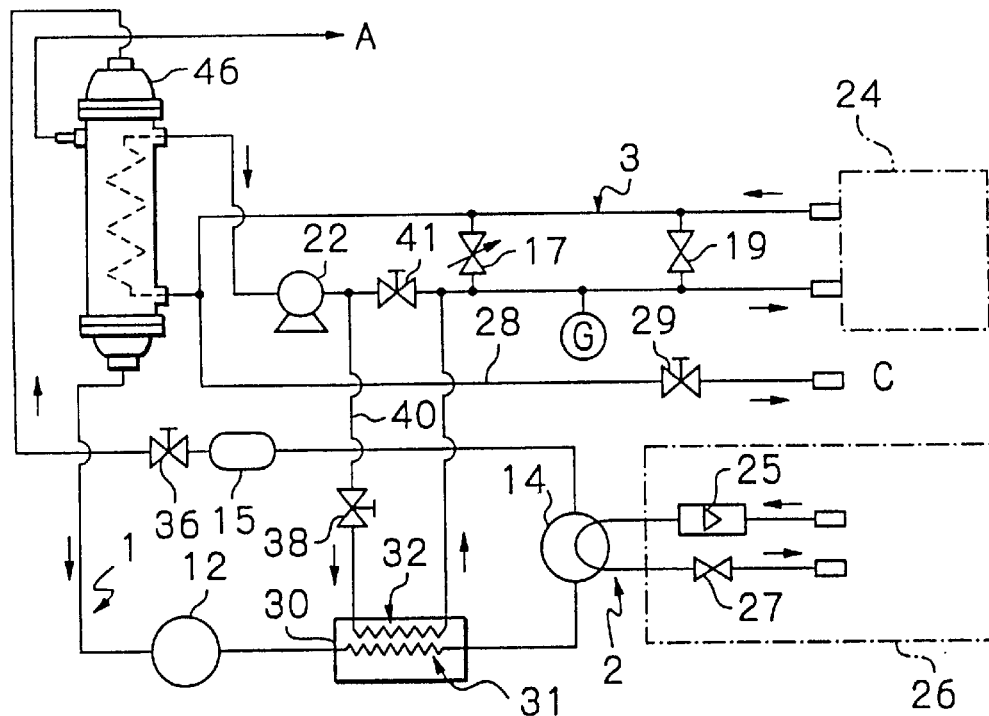
FIG. 2 is a schematic diagram of the temperature control device according to the second embodiment of the invention.

Referring to FIG. 2, there is shown a temperature control device for thermal medium fluid of a second embodiment of the present invention. In this embodiment, the evaporator is comprised of a multi-tube type cylindrical evaporator 46 having a great capacity of cold water, and this cylindrical evaporator 46 works the same as the constant temperature tank 16 in FIG. 1. The capacity of the cylindrical evaporator 46 is preferably 0.1 to 2.0 times of cold water flow per minute, more preferably 0.25 to 1.5, further preferably 0.5 to 1.0. Thus, according to the second embodiment of the invention, it becomes possible to eliminate the constant temperature tank so that the overall size of the device is reduced.

Figure 3:
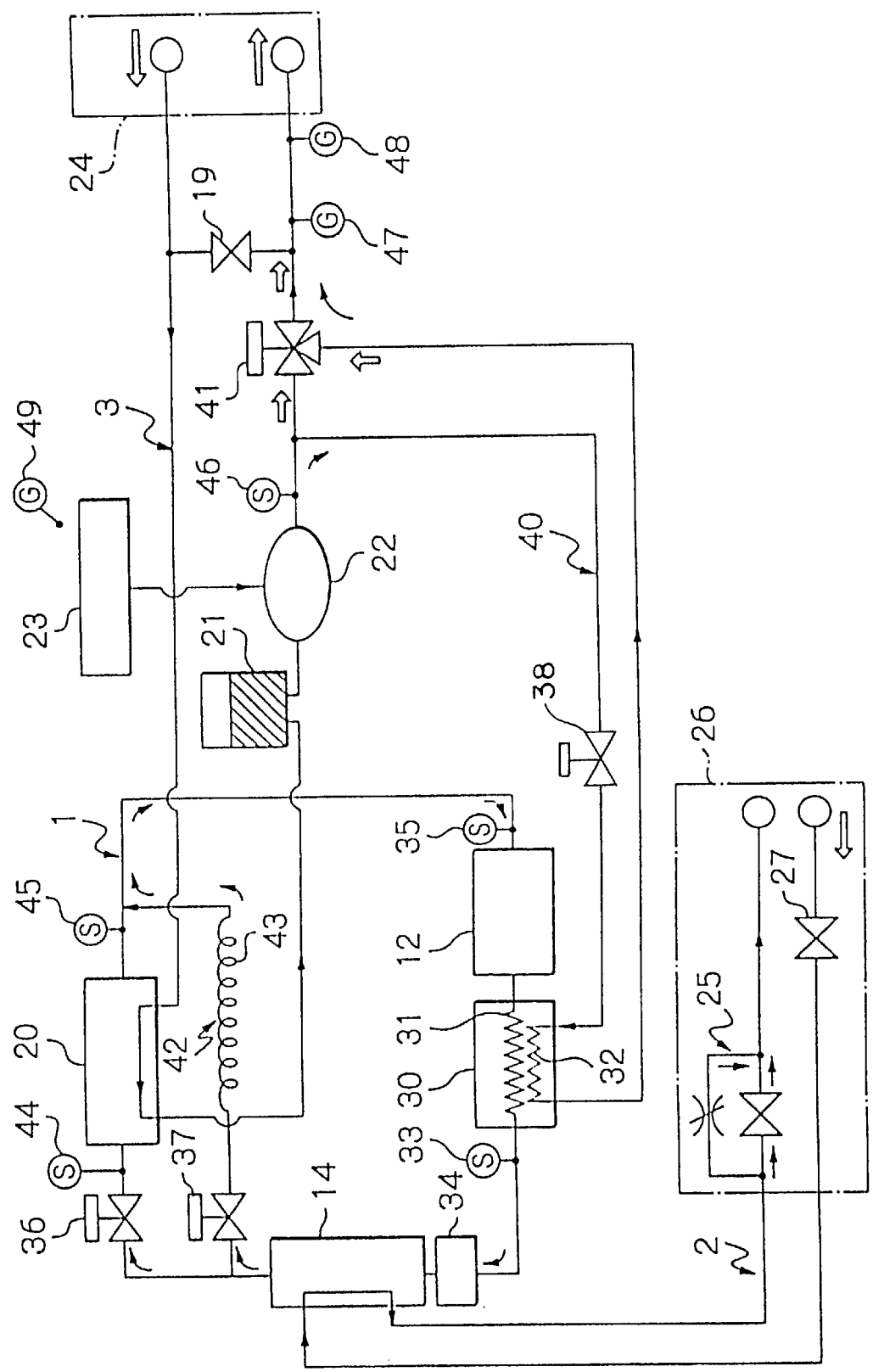
FIG. 3 is a schematic diagram of the temperature control device in its starting mode according to the third embodiment of the invention.
Figure 4:
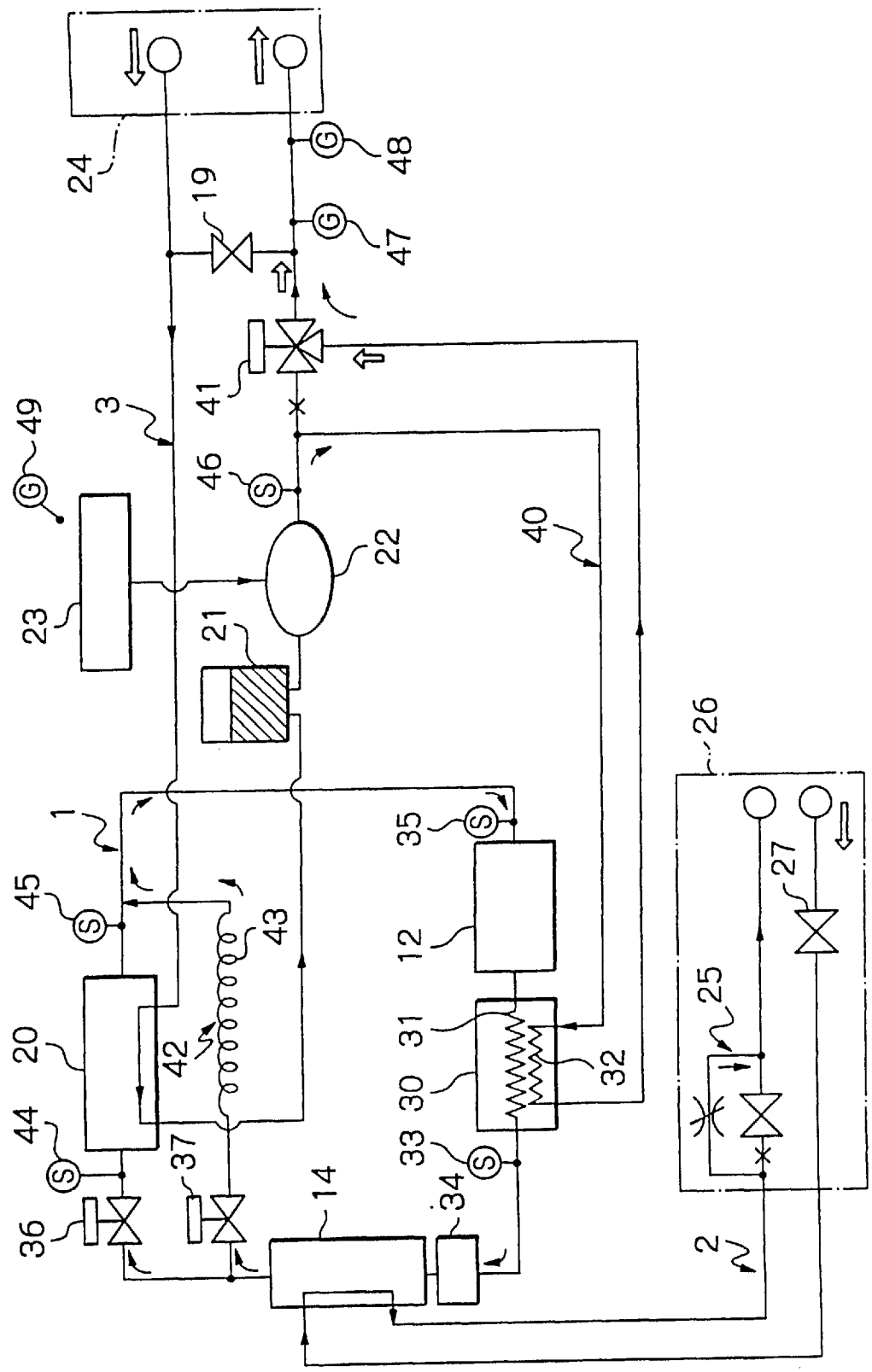
FIG. 4 is a schematic diagram of the device of FIG. 3 in its heating mode.
Figure 5:
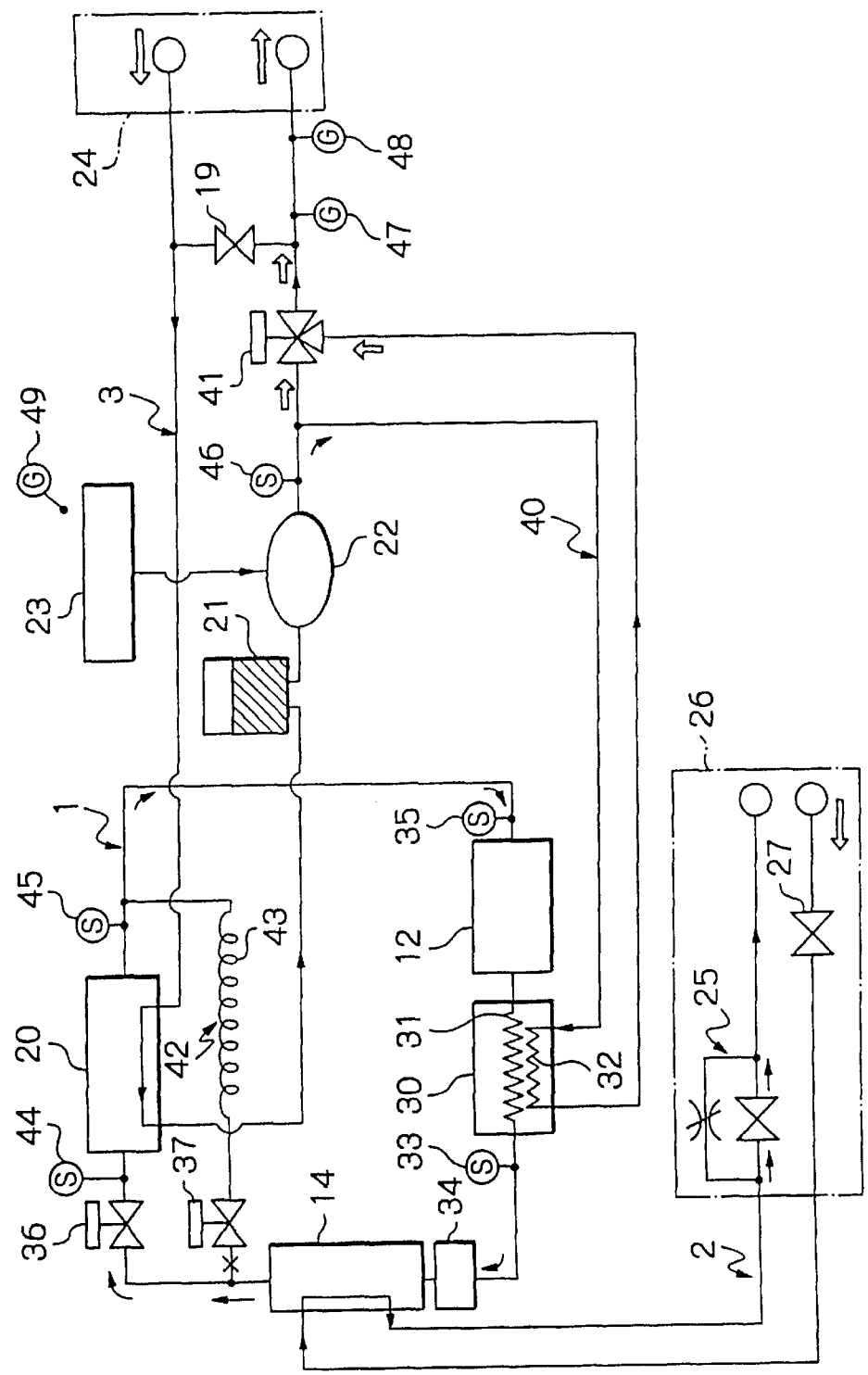
FIG. 5 is a schematic diagram of the device of FIG. 3 in its cooling mode.

Referring to FIGS. 3 to 5, there is shown a temperature control device for thermal medium fluid of a third embodiment of the present invention. This device comprises a refrigerating circuit 1, a cooling circuit 2 for a condenser 14, and a thermal medium fluid circulation circuit 3 for circulating thermal medium fluid toward an external secondary heat load 24 by a pump 22. The circuit 1 includes a compressor 12, a condenser 14, a PI control expansion valve 36, and an evaporator 20. The pump 22 is controlled by an inverter 23.

FIG. 3 shows a starting mode from a low temperature range between −40 degree C. and −10 degree C. to room temperature, FIG. 4 shows a heating mode from room temperature to a high temperature range between 50 degree C. and 60 degree C., and FIG. 5 shows a cooling mode in a standard working condition.

In this embodiment, cold water (thermal medium fluid) is produced by the refrigerating circuit 1, and the produced cold water is supplied to the external secondary heat load 24 such as a semiconductor manufacturing device by the cold water supply pump 22. The condenser 14 is provided with a water cooling type cooler 26 which can be cooled by cooling tower water, factory circulation water or underground water, so that the condenser 14 is cooled by a cold water circulation operated by a flow switch 25 with a throttle valve and a water flow control valve 27. Within the thermal medium fluid circulation circuit 3, a relief valve 19 and a buffer tank 21 with a level meter are disposed. Other gauges and sensors such as a high pressure sensor 33, a low pressure sensor 35, temperature sensors 44, 45, a pressure sensor 46, a flow meter 47, a water temperature gauge 48, a room temperature gauge 49 are connected as required. At the inlet side of the condenser 14, a storage tank 34 for fron gas is disposed in order to prevent the fron gas pressure from going up extraordinarily.

Based upon the characteristics of the invention, a heat exchanger 30, preferably made by a multi-tube type having a property of small flow resistance, is interposed within a compression circuit between the compressor 12 and the condenser 14 so that the compression circuit 31 becomes a primary circuit of the heat exchanger 30. At the downstream side of the cold water supply pump 22, a bypass circuit 40 and an electrically driven three way flow control valve 41 are disposed so that through the bypass circuit thermal medium fluid passes through the secondary circuit 32 of the heat exchanger 30 toward the circulation circuit 3.

Thus, a part of the cold water supplied from the cold water supply pump 22 to the external secondary heat load 24 is delivered to the bypass 40 by an operation of the electrically driven three way flow control valve 41. The cold water heated by the heat exchanger 30 is returned to the cold water circulation circuit 3 toward the downstream side of the cold water supply pump 22. By electrically controlling the fluid flow passing through the flow control valve 38 (PID control), the quantity of heated water mixed with the cold water supplied to the external secondary heat load 24 can be controlled, so that temperature control of the cold water is effected.

Based upon the further characteristics of the invention, a second bypass circuit 42 is interposed between the downstream side of the condenser 14 and the downstream side of the evaporator 20, and a capillary tube 43 and an electromagnetic valve 37 are disposed within the second bypass circuit 42. Thus, the fluid flow in the second bypass circuit 42 is controlled by an ON and OFF operation of the electromagnetic valve 37, whereby the cooling temperature by the evaporator 20 is controlled and overheating of the compressor 12 is prevented.

In this starting mode, when it is raised from the low range between −40 degree C. and −10 degree C. to the level of room temperature, the heat of the cooler 26 is introduced to the condenser 14 in order to avoid a temporary suspension of the compressor 12. This type of suspension is caused by an accident in which the low pressure side of the refrigerating circuit becomes a vacuum condition.

On the other hand, during the heating mode in FIG. 4 after the opening operation, the electromagnetic valve 37 is opened (ON), the pump side of the three way valve 41 is closed (OFF), the electromagnetic valve 25 of the cooler 26 is closed (OFF), whereby heat absorbing performance of the evaporator 20 is low. The heat exchanger 30 is kept in high temperature, and the condenser 14 is also kept in high temperature.

Thus, it becomes possible to use the compressor 12 as a heater. During this mode, in order to avoid overheating of the compressor 12 and to protect the compressor 12, fron gas is introduced into the bypass circuit 42 of the capillary tube 43.

During a cooling mode in FIG. 5 in a standard stable condition, the electromagnetic valve 37 is closed (OFF), the pump side of the three way valve 41 is opened (ON), the heat exchanger side of the three way valve 41 is opened (ON), and the electromagnetic valve 25 of the cooler 26 is opened (ON), whereby heat absorbing performance of the evaporator 20 is high. The heat exchanger 30 and the condenser 14 are kept in relatively low temperature as compared with the starting mode and the heating mode.

As a result of an experiment using this temperature control device, an electrical power consumption is reduced to fifty percent relative to the prior chiller unit, whereby the temperature control performance is greatly improved. Further, since the electrical heater is eliminated, the size of the chiller unit is reduced and quantity of circulation water is relatively saved.

Figure 6:
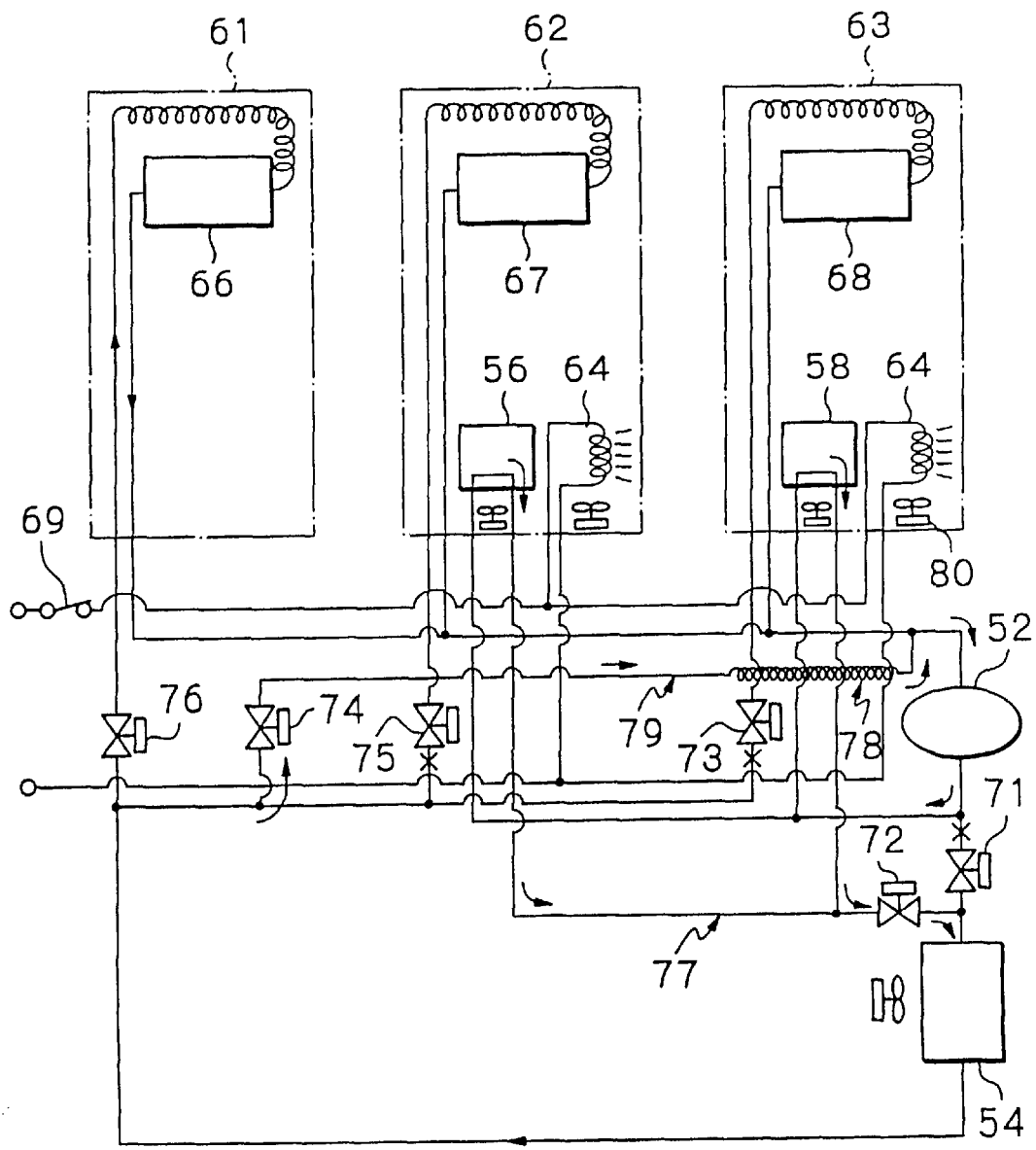
FIG. 6 is a schematic diagram of the temperature control device in its winter mode according to the fourth embodiment of the invention.
Figure 7:
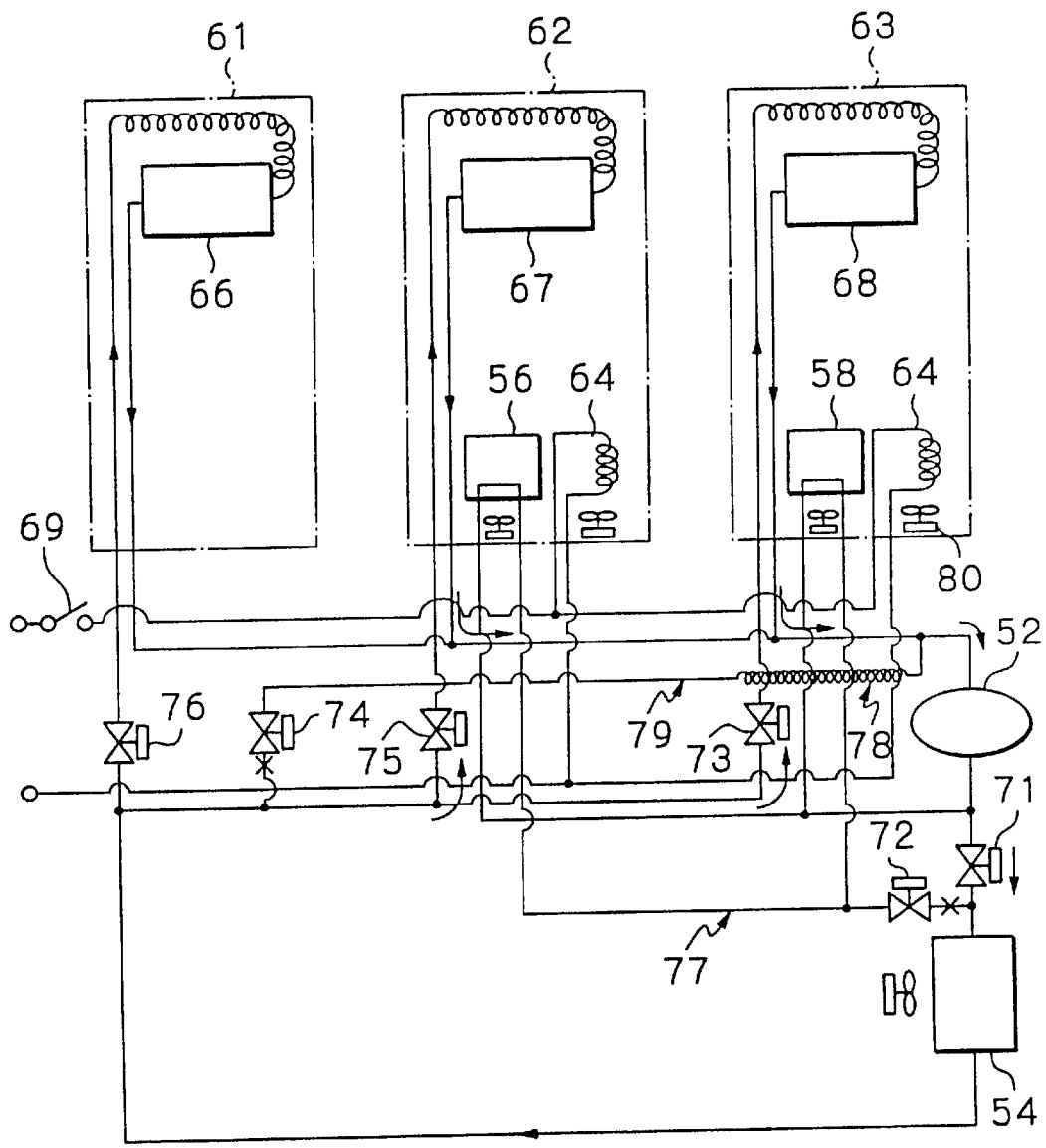
FIG. 7 is a schematic diagram of the device of FIG. 6 in its summer mode.
Figure 8:
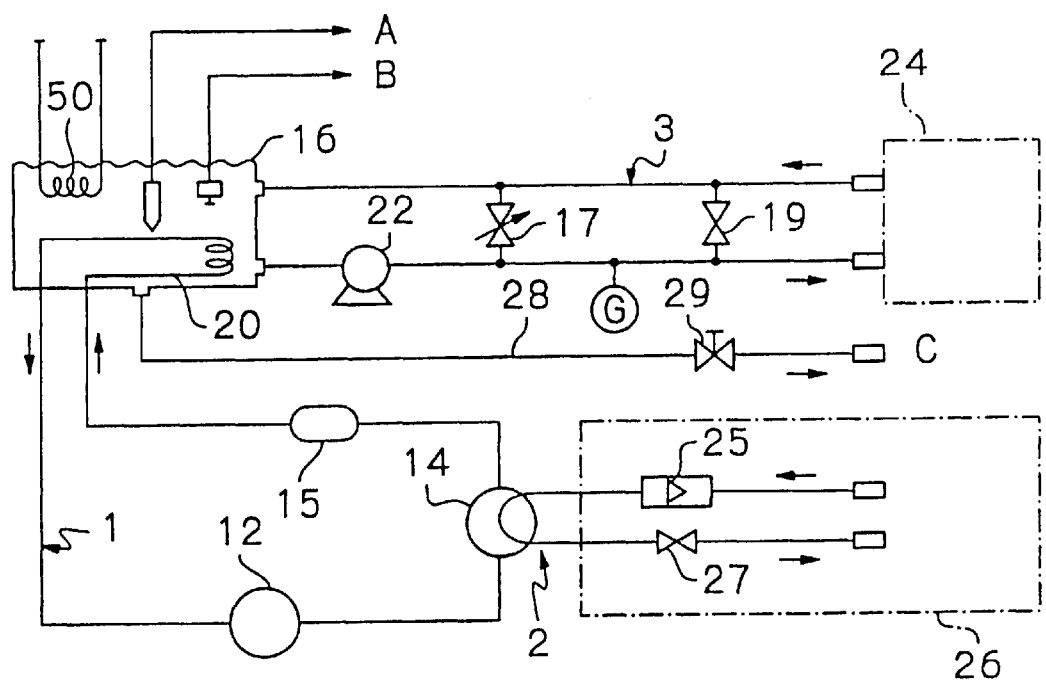
FIG. 8 is a schematic diagram of the temperature control device according to the prior art.

Referring to FIGS. 6 and 7, there is shown a temperature control device for an automatic vending machine of a fourth embodiment of the present invention. This device includes three compartments consisting of a cooling compartment 61, and two cooling and heating variable compartments 62, 63, each of them containing articles such as soft drinks.

Within each compartment, one of evaporators 66, 67, 68 is disposed so that inside air as thermal medium fluid is cooled by a refrigerating circuit including a condenser 52 and an evaporator 54. FIG. 6 shows a winter mode in which the variable compartments 62, 63 are laid on heating mode corresponding to winter, and FIG. 7 shows a summer mode in which the variable compartments 62, 63 are laid on cooling mode corresponding to summer.

Based upon the characteristics of the invention, at an inlet side of each evaporator a first electromagnetic valve 73, 75 or 76 is disposed, and at an intermediate point between an outlet side of the compressor 52 and an inlet side of the condenser 54 a second electromagnetic valve 71 is disposed. Further, a first bypass circuit 77 is interposed between the outlet side of the compressor 52 and the inlet side of the condenser 54 so that this bypass circuit 77 can bypass the second electromagnetic valve 71. The first bypass circuit 77 includes a third electromagnetic valve 72 and extends into the cooling and heating variable compartments 62, 63, and within each variable compartment one of heat exchangers 56, 58 is disposed.

Thus, through the exchange operation of the first, second and third electromagnetic valves, it becomes possible to select a heat absorbing mode (cooling) by the evaporators 67, 68 and heat emitting mode (heating) by the heat exchangers 56, 58.

According to further characteristics of the invention, a second bypass circuit 79 is interposed between the downstream side of the condenser 54 and the downstream side of the evaporators 67, 68, and a capillary tube 78 and a fourth electromagnetic valve 74 are disposed within the second bypass circuit 79. Thus, the fluid flow in the second bypass circuit 79 is controlled by the fourth electromagnetic valve 74, whereby the cooling temperature cooled by the evaporators 67, 68 is controlled. In addition, overheating of the compressor 52 is prevented.

In operation in the winter mode as shown in FIG. 6, the electromagnetic valves 71, 73, 75 are closed (OFF) thereby ceasing the cooling work of the evaporators 67, 68, and the electromagnetic valves 72, 74 are opened (ON) thereby raising the temperature of the heat exchangers 56, 58 in the first bypass circuit 77. Thus, the variable compartments 62, 63 are laid on high temperature heating mode. On the other hand, the electromagnetic valve 76 for the cooling compartment 61 is usually opened (ON) so that the evaporator 66 works. Thus, the cooling compartment 61 is always kept in low temperature cooling mode.

Under the above condition, from a view point of thermal energy, the working of the evaporator 66 results in heat radiation and it is transferred to the heat exchangers 56, 58, whereby the total energy for the vending machine is reduced and saved.

In operation in the summer mode as shown in FIG. 7, the electromagnetic valves 71, 73, 75 are opened (ON) thereby urging the cooling work of the evaporators 67, 68, and the electromagnetic valves 72, 74 are closed (OFF) thereby ceasing the work of the heat exchangers 56, 58 in the first bypass circuit 77. Thus, the variable compartments 62, 63 are laid on low temperature cooling mode.

As a modified embodiment, supplementary electrical heaters 64 can be disposed within the variable compartments 62, 63 so that ON and OFF operations are effected by an electrical switch 69. Further, it may be advantageous to arrange cooling fans 80 near the condenser 54, heat exchangers 56, 58 and supplementary heaters 64, since these positions are laid on high temperature conditions during the operation.

What is claimed is:

1. A temperature control device for thermal medium fluid, comprising:

a refrigeration circuit including a compressor, a condenser and an evaporator;

a thermal medium fluid circulation circuit, including a pump, to supply thermal medium fluid to an external secondary heat load;

a heat exchanger, interposed within a compression circuit, between said compressor and said condenser, wherein said compression circuit is a primary circuit of said heat exchanger;

a bypass circuit disposed at a downstream side of said pump, wherein said bypass circuit is a secondary circuit of said heat exchanger, whereby thermal fluid is to flow through said bypass circuit and heat exchanger into said thermal medium fluid circulation circuit; and a flow control valve in said bypass circuit, whereby an amount of thermal medium fluid flowing through said bypass circuit, heated by said heat exchanger and introduced into said thermal medium fluid circulation circuit can be controlled such that the temperature of the thermal medium fluid supplied to said secondary heat load can be controlled.

2. The temperature control device according to claim 1, wherein said evaporator comprises a constant temperature tank from which thermal medium fluid is to be supplied to said pump and then to the external secondary heat load.

3. The temperature control device according to claim 2, wherein said constant temperature tank comprises a multi-tube cylindrical evaporator.

4. The temperature control device according to claim 1, further comprising a cooling circuit for said condenser.

5. The temperature control device according to claim 4, further comprising an additional bypass circuit between a downstream side of said condenser and a downstream side of said evaporator, and a capillary tube and an electromagnetic valve disposed within said additional bypass circuit, whereby fluid flow through said additional bypass circuit is to be controlled by said electromagnetic valve such that the cooling temperature of said evaporator can be controlled and overheating of said compressor can be prevented.

6. The temperature control device according to claim 5, wherein an electromagnetic valve having a throttle is disposed within said cooling circuit for said condenser, whereby the temperature of said condenser can be controlled.

* * * * *